(12) United States Patent
Viger et al.

(10) Patent No.: US 10,356,664 B2
(45) Date of Patent: Jul. 16, 2019

(54) TRANSMISSION METHOD FOR TRIGGER FRAME BY A 802.11AX ACCESS-POINT

(71) Applicant: CANON KABUSHIKI KAISHA, Tokyo (JP)

(72) Inventors: Pascal Viger, Janze (FR); Stéphane Baron, Le Rheu (FR); Patrice Nezou, Liffre (FR)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 15/656,268

(22) Filed: Jul. 21, 2017

(65) Prior Publication Data
US 2018/0027453 A1    Jan. 25, 2018

(30) Foreign Application Priority Data

Jul. 25, 2016  (GB) .................................. 1612875.3

(51) Int. Cl.
| | | |
|---|---|---|
| *H04W 72/12* | (2009.01) | |
| *H04W 28/26* | (2009.01) | |
| *H04W 72/04* | (2009.01) | |
| *H04W 74/08* | (2009.01) | |
| *H04L 5/00* | (2006.01) | |

(52) U.S. Cl.
CPC ......... *H04W 28/26* (2013.01); *H04W 72/048* (2013.01); *H04W 72/0446* (2013.01); *H04W 72/1247* (2013.01); *H04W 72/1289* (2013.01); *H04W 74/0816* (2013.01); *H04L 5/00* (2013.01)

(58) Field of Classification Search
CPC ..... H04W 28/06; H04W 72/12; H04W 72/04; H04W 72/048; H04W 72/0446
See application file for complete search history.

(56) References Cited

U.S. PATENT DOCUMENTS

| | | |
|---|---|---|
| 2010/0080188 A1 | 4/2010 | Ho et al. |
| 2011/0225272 A1 | 9/2011 | Montemurro et al. |
| 2014/0328195 A1 | 11/2014 | Sampath et al. |

(Continued)

FOREIGN PATENT DOCUMENTS

| | | |
|---|---|---|
| EP | 3157300 A1 | 4/2017 |
| GB | 2511866 A | 9/2014 |

(Continued)

*Primary Examiner* — Chi Ho A Lee
(74) *Attorney, Agent, or Firm* — Canon U.S.A., Inc. I.P. Division

(57) ABSTRACT

A wireless communication method in a wireless network comprising an access point and a plurality of stations. The method includes selecting a transmission mode among a first and a second transmission modes, wherein access to a communication channel in the first transmission mode uses a contention mechanism with stations of the network, while access to the communication channel in the second transmission mode uses a preemption mechanism; sending a trigger frame to the stations using the selected transmission mode, the trigger frame reserving a transmission opportunity on at least one communication channel of the wireless network and defining resource units forming the communication channel and including a plurality of resource units that the stations can access for sending data; and receiving data from stations over the defined resource units.

5 Claims, 11 Drawing Sheets

(56) References Cited

U.S. PATENT DOCUMENTS

| | | | |
|---|---|---|---|
| 2015/0382380 A1* | 12/2015 | Li | H04W 24/02 |
| | | | 370/329 |
| 2016/0088513 A1* | 3/2016 | Huang | H04W 74/0816 |
| | | | 370/328 |
| 2016/0113009 A1 | 4/2016 | Seok | |
| 2016/0198500 A1 | 7/2016 | Merlin et al. | |
| 2016/0227531 A1* | 8/2016 | Thoukydides | H04W 74/006 |
| 2016/0227565 A1* | 8/2016 | Ghosh | H04W 72/1268 |
| 2017/0048046 A1* | 2/2017 | Sun | H04L 5/0007 |
| 2017/0257887 A1* | 9/2017 | Ghosh | H04W 74/0808 |
| 2017/0325278 A1* | 11/2017 | Ramkumar | H04W 52/0212 |
| 2018/0014325 A1* | 1/2018 | Dvory | H04W 72/0446 |
| 2018/0092032 A1* | 3/2018 | Choi | H04L 27/26 |
| 2018/0176901 A1* | 6/2018 | Huang | H04W 72/0413 |
| 2018/0242355 A1* | 8/2018 | Lou | H04W 72/121 |
| 2018/0279371 A1* | 9/2018 | Li | H04L 5/001 |

FOREIGN PATENT DOCUMENTS

| | | |
|---|---|---|
| WO | 2015/070087 A1 | 5/2015 |
| WO | 2015/194727 A1 | 12/2015 |

* cited by examiner

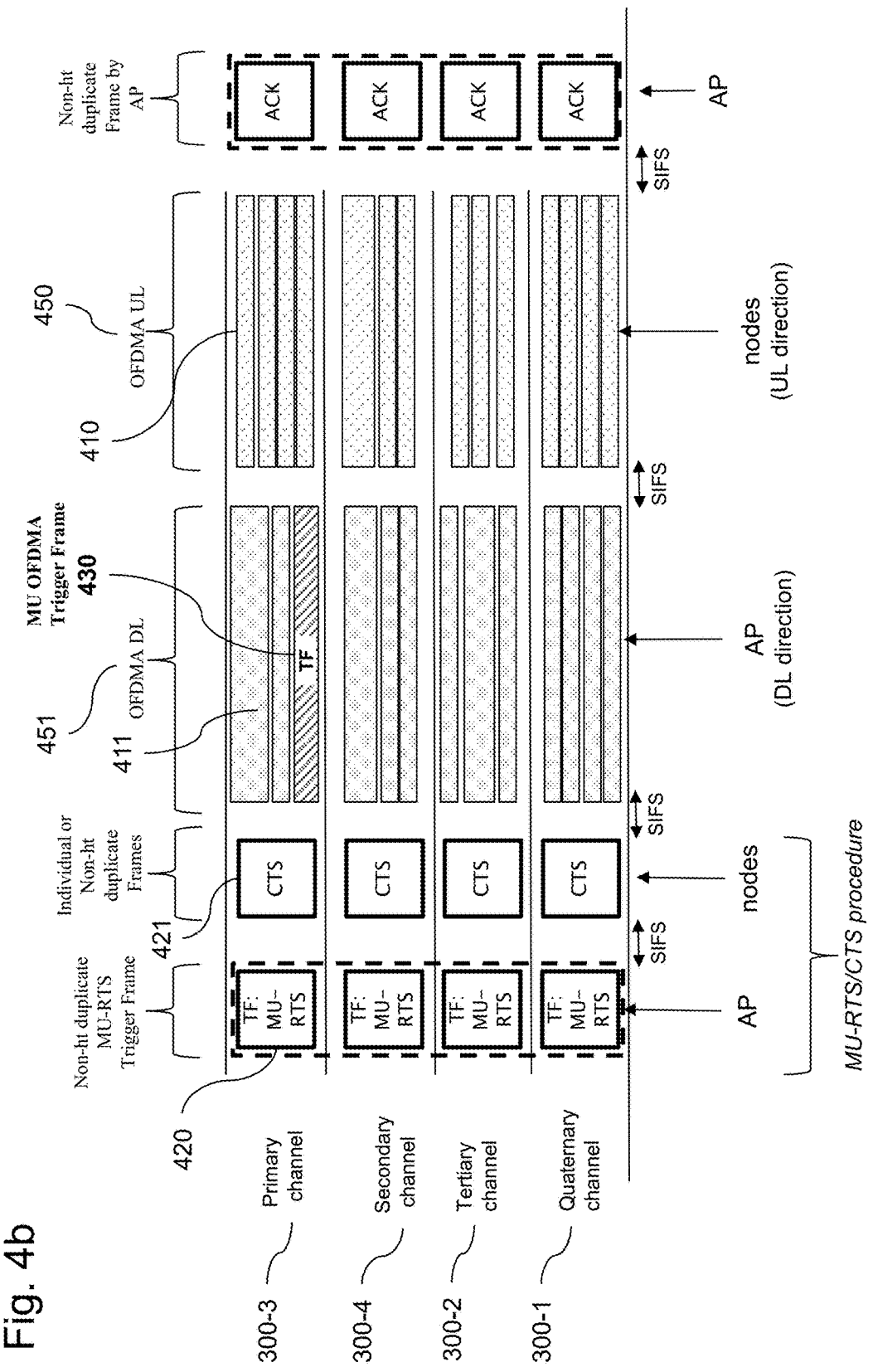

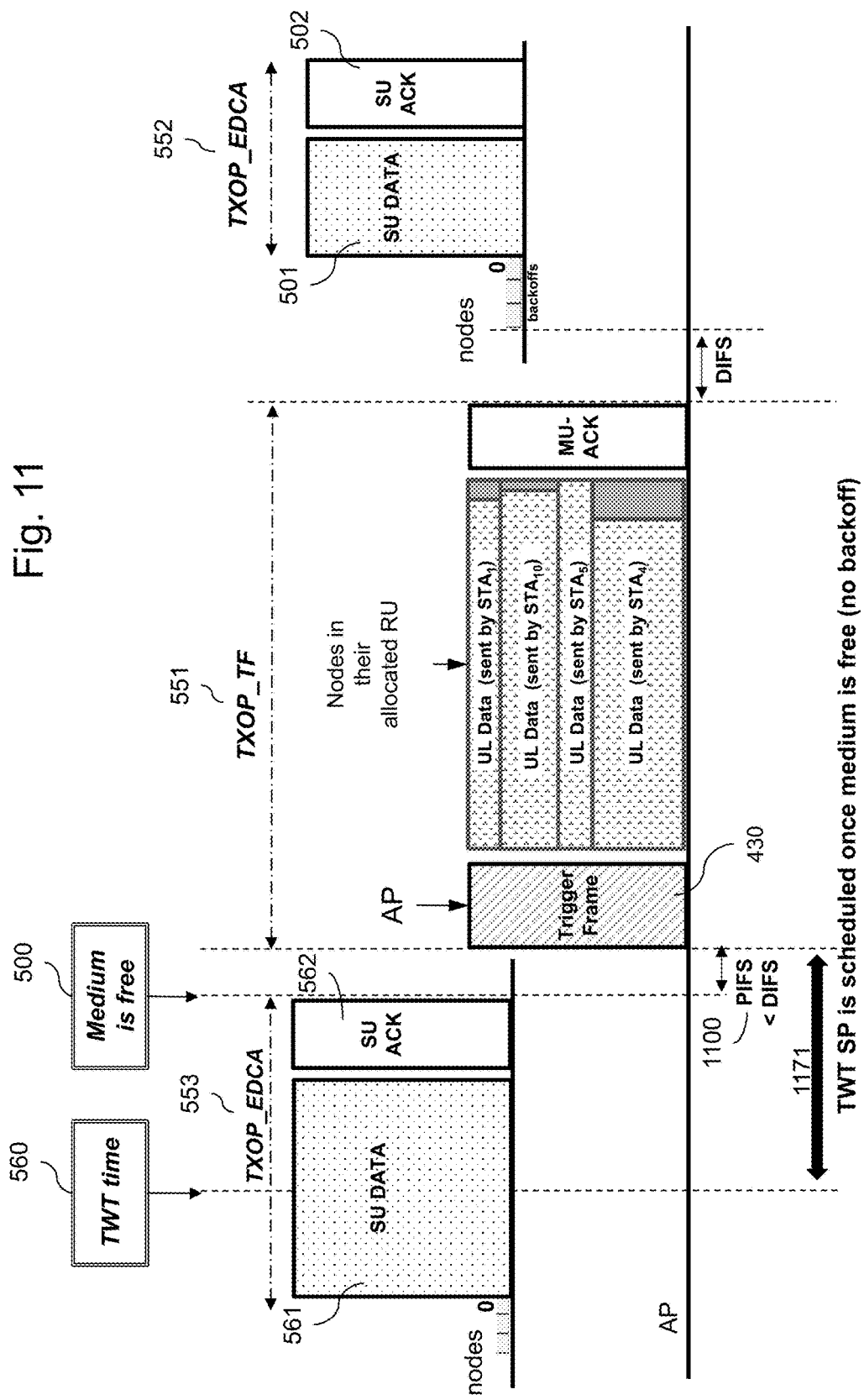

TRANSMISSION METHOD FOR TRIGGER FRAME BY A 802.11AX ACCESS-POINT

CROSS REFERENCE TO RELATED APPLICATION

This application claims the benefit under 35 U.S.C. § 119(a)-(d) of United Kingdom Patent Application No. 1612875.3 filed on Jul. 25, 2016 and entitled "Transmission method for trigger frame by a 802.11ax access-point." The above cited patent application is incorporated herein by reference in its entirety.

FIELD OF THE INVENTION

The present invention relates generally to communication networks and more specifically to wireless communication methods in wireless network comprising an access point (AP) and a plurality of non-AP stations, and corresponding devices.

The IEEE 802.11 MAC family of standards (a/b/g/n/ac/ etc.) define a way wireless local area networks (WLANs) must work at the physical and medium access control (MAC) level. Typically, the 802.11 MAC (Medium Access Control) operating mode implements the well-known Distributed Coordination Function (DCF) which relies on a contention-based mechanism based on the so-called "Carrier Sense Multiple Access with Collision Avoidance" (CSMA/CA) technique.

More recently, Institute of Electrical and Electronics Engineers (IEEE) officially approved the 802.11ax task group, as the successor of 802.11ac. The primary goal of the 802.11ax task group consists in seeking for an improvement in data speed to wireless communicating devices used in dense deployment scenarios.

In this context, multi-user (MU) transmission has been considered to allow multiple simultaneous transmissions to/from different users in both downlink (DL) and uplink (UL) directions from/to the AP and during a transmission opportunity granted to the AP. In the uplink, multi-user transmissions can be used to mitigate the collision probability by allowing multiple non-AP stations to simultaneously transmit.

To actually perform such multi-user transmission, it has been proposed to split a granted channel into sub-channels, also referred to as resource units (RUs), that are shared in the frequency domain by multiple users (non-AP stations), based for instance on Orthogonal Frequency Division Multiple Access (OFDMA) technique. Each RU may be defined by a number of tones, the 80 MHz channel containing up to 996 usable tones.

OFDMA is a multi-user variation of OFDM which has emerged as a new key technology to improve efficiency in advanced infrastructure-based wireless networks. It combines OFDM on the physical layer with Frequency Division Multiple Access (FDMA) on the MAC layer, allowing different subcarriers to be assigned to different stations in order to increase concurrency. Adjacent sub-carriers often experience similar channel conditions and are thus grouped to sub-channels: an OFDMA sub-channel or RU is thus a set of sub-carriers.

The multi-user feature of OFDMA allows the AP to assign different RUs to different non-AP stations in order to increase competition. This may help to reduce contention and collisions inside 802.11 networks.

In OFDMA, different subsets of sub-carriers in the channel bandwidth can be used by different frame transmissions at the same time. In the downlink direction, the AP is allowed to emit parallel transmissions to different receivers. These transmissions are called Multi-User Downlink transmissions (MU DL). In addition, the AP can provide uplink transmission schedules to clients; this kind of transmission scheme is called Multi-User Uplink (MU UL).

To support multi-user uplink, i.e. uplink transmission to the 802.11ax access point (AP) during the granted TXOP, the 802.11ax AP has to provide signalling information for the legacy stations (non-802.11ax stations) to set their NAV and for the 802.11ax client stations to determine the allocation of the resource units RUs provided by the AP.

The AP sends a new control frame called a "Trigger Frame" (TF), to solicit the transmission of uplink (UL) Multi-User (OFDMA) PPDU from multiple stations. The TF defines the resource units as provided by the AP to the client stations. In response, the stations transmit UL MU (OFDMA) PPDU as immediate responses to the Trigger frame. All transmitters can send data at the same time, but using disjoint sets of RUs (i.e. of frequencies in the OFDMA scheme), resulting in transmissions with less interference.

The 802.11ax standard considers several types of Trigger Frame, or in other words, a Trigger Frame can be used to trigger various information to the client stations. For example, trigger frame may be used to retrieve uplink data traffic stored at client stations. A Trigger Frame may also be used to request Buffer Status Reports (BSRs) from stations to determine which 802.11ax stations hold uplink packets waiting for transmission and their related size (amount of data in stations buffers).

There is thus a need to provide a transmission methods adapted to the type of control frames in general, and to Trigger Frames in particular, for a proper operation of the wireless network.

SUMMARY OF THE INVENTION

The present invention seeks to overcome the foregoing concerns.

In this context, first embodiments of the invention provides a wireless communication method in a wireless network comprising an access point and a plurality of stations, the method comprising the following steps, at the access point:

selecting a transmission mode among a first and a second transmission modes, wherein access to a communication channel in the first transmission mode uses a contention mechanism with stations of the network, while access to the communication channel in the second transmission mode uses a preemption mechanism;

sending a trigger frame to the stations using the selected transmission mode, the trigger frame reserving a transmission opportunity on at least one communication channel of the wireless network and defining resource units forming the communication channel and including a plurality of resource units that the stations can access for sending data; and receiving data from stations over the defined resource units.

In one implementation, the selecting is based on at least one of the following: nature of trigger frame, priority of the trigger frame, class of data traffic to be transmitted in the resource units defined by the trigger frame, and measure of congestion in the network.

There also provided according to second embodiments of the invention a wireless communication method in a wireless network comprising a physical access point and a plurality of stations, the method comprising the following steps, at the access point:

selecting a transmission queue associated with an access category, the access category defining a priority for accessing the wireless network;

sending a trigger frame to the stations using the selected transmission queue, the trigger frame reserving a transmission opportunity on at least one communication channel of the wireless network and defining resource units forming the communication channel and including a plurality of resource units that the stations can access for sending data; and receiving data from stations over the defined resource units.

Correlatively, the invention provides a communication device acting as a physical access point in a wireless network also comprising a plurality of stations organized into groups (BSSs), the communication device acting as a physical access point comprising at least one microprocessor configured for carrying out the above steps.

Another aspect of the invention relates to a wireless communication system having a physical access point and at least one communication device forming node as defined above.

Another aspect of the invention relates to a non-transitory computer-readable medium storing a program which, when executed by a microprocessor or computer system in a device of a communication network, causes the device to perform any method as defined above.

The non-transitory computer-readable medium may have features and advantages that are analogous to those set out above and below in relation to the methods and node devices.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIG. 4b illustrates, using a timeline, an example of 802.11ax OFDMA transmission scheme, as known by the 802.11ax standard, involving both downlink and uplink transmission phases, over an exemplary transmission opportunity protected by a MU-RTS/CTS handshake procedure on an 80 MHz channel;

FIG. 11 illustrates, using a timeline, a scenario of transmission of a scheduled TF according to embodiments of the invention.

DETAILED DESCRIPTION OF THE INVENTION

The invention will now be described by means of specific non-limiting exemplary embodiments and by reference to the figures.

Figure 1:
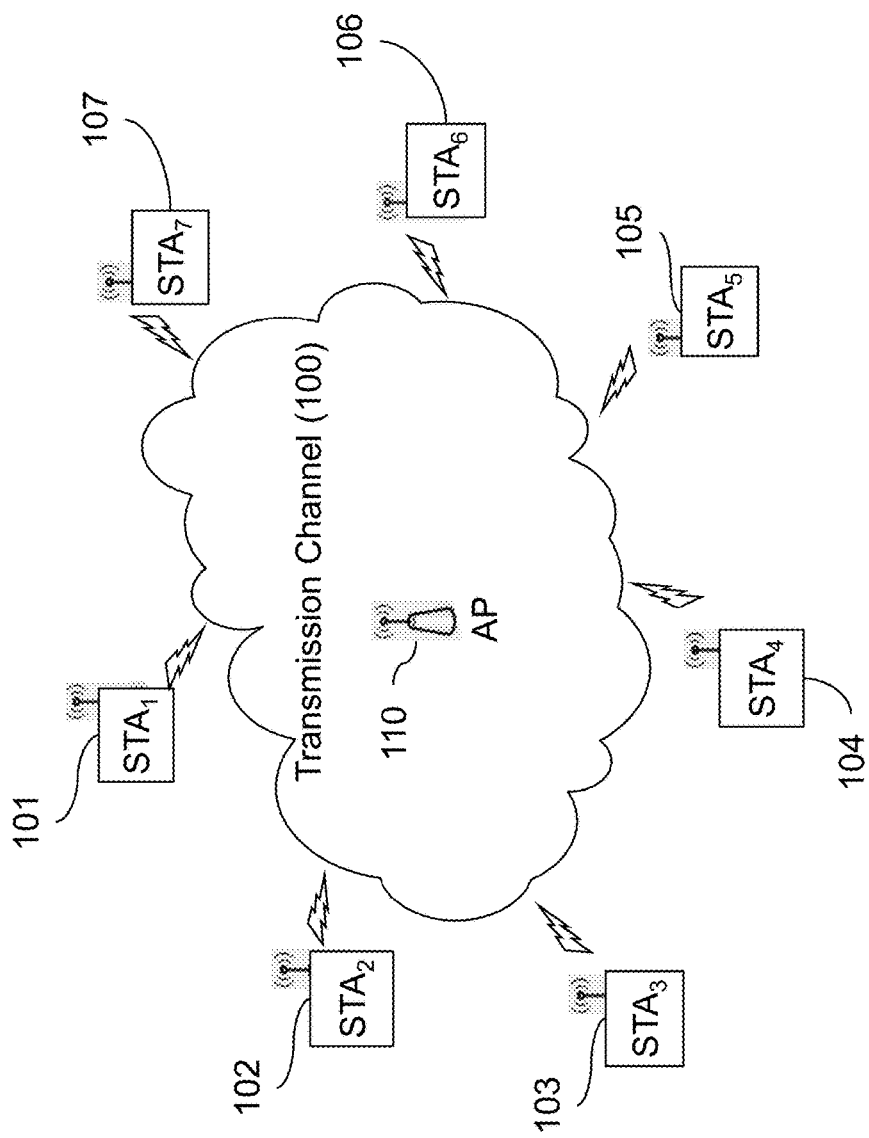
FIG. 1 illustrates a typical wireless communication system in which embodiments of the invention may be implemented.

FIG. 1 illustrates a communication system in which several communication stations 101-107 exchange data frames over a radio transmission channel 100 of a wireless local area network (WLAN), under the management of a central station, or access point (AP) 110, also seen as a station of the network. The radio transmission channel 100 is defined by an operating frequency band constituted by a single channel or a plurality of channels forming a composite channel.

In the following, the word "station" refers to any kind of station. The wording "access point station", or in short "access point" (AP), refers to the station playing the role of access point 110. The wording "non access point station", or in short "non-AP station", or client station (STA) refers to the other stations 101-107.

Access to the shared radio medium to send data frames is primarily based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source or transmitting station, including the AP, first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the source station continues to wait until the radio medium becomes idle.

Access to the medium is driven by a backoff counter (see FIG. 2a) that is decremented over time, to defer the transmission time for a random interval, thus reducing the probability of collisions on the shared channel. Upon the backoff time expiring, the source station may send data or control frames if the medium is idle.

The wireless communication system of FIG. 1 comprises a physical access point 110 configured to manage the WLAN BSS (Basic Service Set), i.e. a group of client stations. Such BSS managed by an AP is called an infrastructure BSS. In the following, the term BSS will be used as an equivalent of infrastructure BSS.

Once the BSS is established, the Access Point can bridge traffic out the BSS onto a distribution network, or inside the BSS. Thus, members of the BSS should talk to the AP only, which is in charge of relaying frames if the frames are targeted to another station of the BSS.

Figure 2:
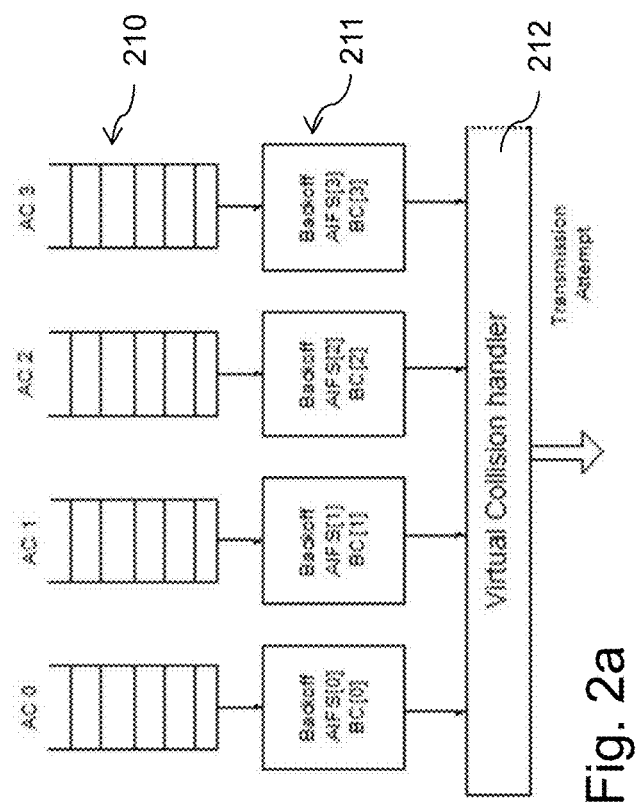
FIGS. 2a and 2b illustrate the IEEE 802.11e EDCA involving access categories.

FIGS. 2a and 2b illustrate the IEEE 802.11e EDCA involving access categories, in order to improve the quality of service (QoS). In the original DCF standard, a communication station includes only one transmission queue/buffer. However, since a subsequent data frame cannot be transmitted until the transmission/retransmission of a preceding frame ends, the delay in transmitting/retransmitting the preceding frame prevents the communication from having QoS.

The IEEE 802.11e has overturned this deficiency in providing quality of service (QoS) enhancements to make more efficient use of the wireless medium.

This standard relies on a coordination function, called hybrid coordination function (HCF), which has two modes of operation: enhanced distributed channel access (EDCA) and HCF controlled channel access (HCCA).

EDCA enhances or extends functionality of the original access DCF method: EDCA has been designed for support of prioritized traffic similar to DiffServ (Differentiated Services), which is a protocol for specifying and controlling network traffic by class so that certain types of traffic get precedence.

EDCA is the dominant channel access mechanism in WLANs because it features a distributed and easily deployed mechanism.

The above deficiency of failing to have satisfactory QoS due to delay in frame retransmission has been solved with a plurality of transmission queues/buffers.

QoS support in EDCA is achieved with the introduction of four Access Categories (ACs), and thereby of four corresponding transmission/traffic queues or buffers (210). Of course, another number of traffic queues may be contemplated.

Each AC has its own traffic queue/buffer to store corresponding data frames to be transmitted on the network. The data frames, namely the MSDUs, incoming from an upper layer of the protocol stack are mapped onto one of the four AC queues/buffers and thus input in the mapped AC buffer.

Each AC has also its own set of channel contention parameters or "queue backoff parameters", and is associated with a priority value, thus defining traffic of higher or lower priority of MSDUs. Thus, there is a plurality of traffic queues for serving data traffic at different priorities.

That means that each AC (and corresponding buffer) acts as an independent DCF contending entity including its respective queue backoff engine 211. Thus, each queue backoff engine 211 is associated with a respective traffic queue for computing a respective queue backoff value to be used to contend access to at least one communication channel in order to transmit data stored in the respective traffic queue.

It results that the ACs within the same communication station compete one with each other to access the wireless medium and to obtain a transmission opportunity.

Service differentiation between the ACs is achieved by setting different queue backoff parameters between the ACs, such as different contention window parameters ($CW_{min}$, $CW_{max}$), different arbitration interframe spaces (AIFS), and different transmission opportunity duration limits (TXOP_Limit).

Each station must wait a fixed amount of time to ensure the medium is clear before attempting transmission. With DCF, the DIFS is constant for all types of traffic. However, with 802.11e the fixed amount of time that a station has to wait will depend on the access category and is referred to as an Arbitration Interframe Space (AIFS).

With EDCA, high priority traffic has a higher chance of being sent than low priority traffic: a station with high priority traffic waits a little less (low CW) before it sends its packet, on average, than a station with low priority traffic.

The four AC buffers (210) are shown in FIG. 2a.

Buffers AC3 and AC2 are usually reserved for real-time applications (e.g., voice or video transmission). They have, respectively, the highest priority and the last-but-one highest priority.

Buffers AC1 and AC0 are reserved for best effort and background traffic. They have, respectively, the last-but-one lowest priority and the lowest priority.

Each data unit, MSDU, arriving at the MAC layer from an upper layer (e.g. Link layer) with a type of traffic (TID) priority is mapped into an AC according to mapping rules. FIG. 2b shows an example of mapping between eight priorities of traffic class (TID values between 0-7 are considered user priorities and these are identical to the IEEE 802.1D priority tags) and the four ACs. The data frame is then stored in the buffer corresponding to the mapped AC.

When the EDCA backoff procedure for a traffic queue (or an AC) ends, the MAC controller (reference 704 in FIG. 7 below) of the transmitting station transmits a data frame from this traffic queue to the physical layer for transmission onto the wireless communication network.

Since the ACs operate concurrently in accessing the wireless medium, it may happen that two ACs of the same communication station have their backoff ending simultaneously. In such a situation, a virtual collision handler (212) of the MAC controller operates a selection of the AC having the highest priority (as shown in FIG. 2b) between the conflicting ACs, and gives up transmission of data frames from the ACs having lower priorities.

Then, the virtual collision handler commands those ACs having lower priorities to start again a backoff operation using an increased CW value.

Figure 3:
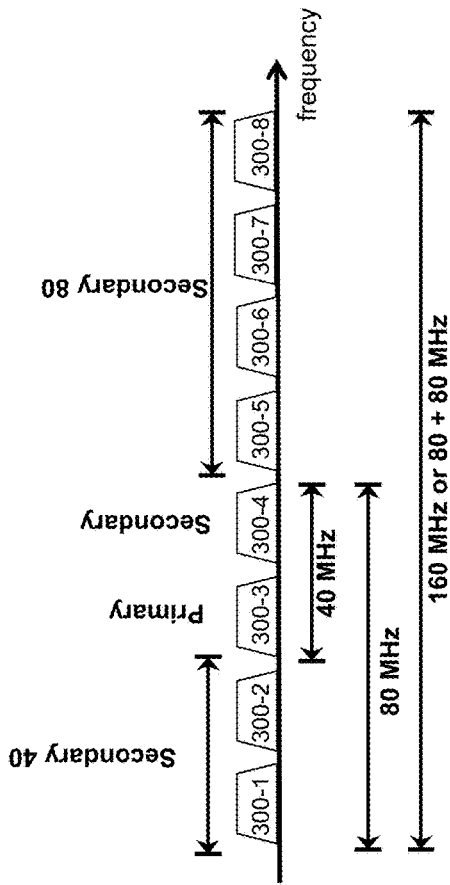
FIG. 3 illustrates 802.11ac channel allocation that supports composite channel bandwidths of 20 MHz, 40 MHz, 80 MHz or 160 MHz, as known in the art.

To meet the ever-increasing demand for faster wireless networks to support bandwidth-intensive applications, 802.11ac is targeting larger bandwidth transmission through multi-channel operations. FIG. 3 illustrates 802.11ac channel allocation that supports composite channel bandwidth of 20 MHz, 40 MHz, 80 MHz or 160 MHz.

IEEE 802.11ac introduces support of a restricted number of predefined subsets of 20 MHz channels to form the sole predefined composite channel configurations that are available for reservation by any 802.11ac station on the wireless network to transmit data.

The predefined subsets are shown in the Figure and correspond to 20 MHz, 40 MHz, 80 MHz, and 160 MHz channel bandwidths, compared to only 20 MHz and 40 MHz supported by 802.11n. Indeed, the 20 MHz component channels 300-1 to 300-8 are concatenated to form wider communication composite channels.

In the 802.11ac standard, the channels of each predefined 40 MHz, 80 MHz or 160 MHz subset are contiguous within the operating frequency band, i.e. no hole (missing channel) in the composite channel as ordered in the operating frequency band is allowed.

The 160 MHz channel bandwidth is composed of two 80 MHz channels that may or may not be frequency contiguous. The 80 MHz and 40 MHz channels are respectively composed of two frequency adjacent or contiguous 40 MHz and 20 MHz channels, respectively.

The present invention may have embodiments with either composition of the channel bandwidth, i.e. including only contiguous channels or formed of non-contiguous channels within the operating band.

A station is granted a TXOP through the enhanced distributed channel access (EDCA) mechanism on the "primary channel" (300-3). Indeed, for each composite channel having a bandwidth, 802.11ac designates one channel as "primary" meaning that it is used for contending for access to the composite channel. The primary 20 MHz channel is common to all client stations (STAs) belonging to the same basic set, i.e. managed by or registered with the same local Access Point (AP).

However, to make sure that no other legacy station (i.e. not belonging to the same set) uses the secondary channels, it is provided that the control frames (e.g. RTS frame/CTS frame) reserving the composite channel are duplicated over each 20 MHz channel of such composite channel.

As addressed earlier, the IEEE 802.11ac standard enables up to four, or even eight, 20 MHz channels to be bound. Because of the limited number of channels (19 in the 5 GHz band in Europe), channel saturation becomes problematic. Indeed, in densely populated areas, the 5 GHz band will surely tend to saturate even with a 20 or 40 MHz bandwidth usage per Wireless-LAN cell.

Developments in the 802.11ax standard seek to enhance efficiency and usage of the wireless channel for dense environments.

In this perspective, one may consider multi-user (MU) transmission features, allowing multiple simultaneous transmissions to/from different users in both downlink (DL) and uplink (UL) directions. In the uplink, multi-user transmissions can be used to mitigate the collision probability by allowing multiple non-AP stations to simultaneously transmit.

To actually perform such multi-user transmission, it has been proposed to split at least one granted 20 MHz channel (300-1 to 300-4) into sub-channels 410 (elementary sub-channels), also referred to as sub-carriers or resource units (RUs), that are shared in the frequency domain by multiple users, based for instance on Orthogonal Frequency Division Multiple Access (OFDMA) technique.

This is illustrated with reference to FIGS. 4a and 4b which illustrate examples of OFDMA transmission scheme. In these examples, each 20 MHz channel (300-1, 300-2, 300-3 or 300-4) is sub-divided in frequency domain into four OFDMA sub-channels or RUs 310 of size 5 MHz. These sub-channels (or resource units or sets of "sub-carriers") may also be referred to as "traffic channels".

Of course the number of RUs splitting a 20 MHz channel may be different from four. For instance, between two to nine RUs may be provided (thus each having a size between 10 MHz and about 2 MHz). It is also possible to have a RU width greater than 20 MHz, when included inside a wider composite channel (e.g. 80 MHz).

Contrary to MU downlink OFDMA wherein the AP can directly send multiple data to multiple stations (supported by specific indications inside the PLCP header), a trigger mechanism has been adopted for the AP to trigger MU uplink communications from various non-AP stations.

To support an uplink multi-user transmission (during a pre-empted TXOP), the 802.11ax AP has to provide signalling information for both legacy stations (i.e. non-802.11ax stations) to set their NAV and for 802.11ax client stations to determine the Resource Units allocation.

In the following description, the term legacy refers to non-802.11ax stations, meaning 802.11 stations of previous technologies that do not support OFDMA communications.

Figure 4A:
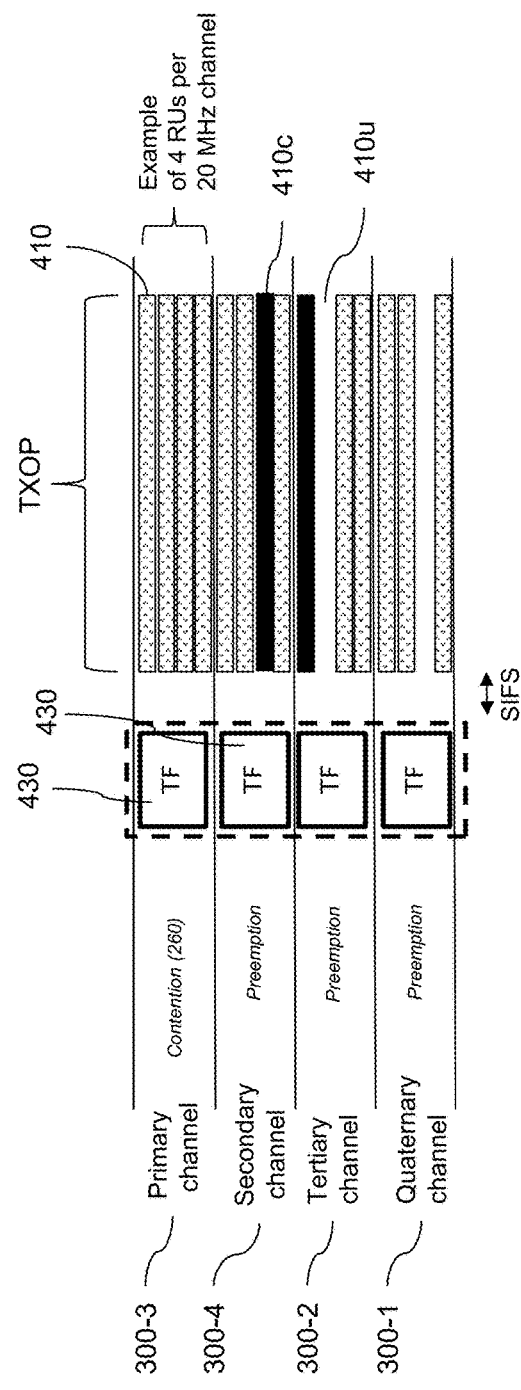
FIG. 4a illustrates, using a timeline, an example of 802.11ax uplink OFDMA transmission scheme, wherein the AP issues a Trigger Frame for reserving a transmission opportunity of OFDMA resource units on an 80 MHz channel as known in the art.

As shown in the example of FIG. 4a, the AP sends a trigger frame (TF) 430 to the targeted 802.11ax stations. The bandwidth or width of the targeted composite channel is signalled in the TF frame, meaning that the 20, 40, 80 or 160 MHz value is signalled. The TF frame is sent over the primary 20 MHz channel and duplicated (replicated) on each other 20 MHz channels forming the targeted composite channel. As described above for the duplication of control frames, it is expected that every nearby legacy station receiving the TF on its primary channel sets its NAV to the value specified in the TF frame. This prevents these legacy stations from accessing the channels of the targeted composite channel during the TXOP.

Based on an AP's decision, the trigger frame TF may define a plurality of resource units (RUs) 410. The multi-user feature of OFDMA allows the AP to assign different RUs to different client stations in order to increase competition. This may help to reduce contention and collisions inside 802.11 networks.

The trigger frame 430 may designate "Scheduled resource units", which may be reserved by the AP for certain stations in which case no contention for accessing such RUs is needed for these stations. Such RUs and their corresponding scheduled stations are indicated in the trigger frame. For instance, a station identifier, such as the Association ID (AID) assigned to each station upon registration, is added in association with each Scheduled RU in order to explicitly indicate the station that is allowed to use each Scheduled RU. Such transmission mode is concurrent to the conventional EDCA mechanism, and the uplink data to be sent to AP is picked from the EDCA queues 210.

The trigger frame TF may also designate "Random resource units", in addition or in replacement of the "Scheduled RUs", which can be randomly accessed by the stations of the network. In other words, Random RUs designated or allocated by the AP in the TF may serve as basis for contention between stations willing to access the communication medium for sending data. A collision occurs when two or more stations attempt to transmit at the same time over the same RU. An AID equal to 0 may be used to identify random RUs.

A random allocation procedure may be considered for 802.11ax standard based on an additional backoff counter (OFDMA backoff, or OBO) inside the 802.11ax non-AP stations for allowing a contention between the stations to send data over an RU. The OFDMA backoff is distinct from the EDCA backoff engines 211, however data transmitted in the OFDMA RUs 410 is assumed to be served from same EDCA buffers 210 according to embodiments of the invention.

The OFDMA random allocation procedure comprises, for a station of a plurality of 802.11ax stations having an positive OBO backoff value (initially drawn inside an OFDMA contention window range), a first step of determining from a received trigger frame the sub-channels or RUs of the communication medium available for contention (the so-called "random RUs"), a second step of verifying if the value of the OBO backoff value local to the considered station is not greater than the number of detected-as-available random RUs, and then, in case of successful verification, a third step of randomly selecting a RU among the detected-as-available RUs for sending data. In case of second step is not verified, a fourth step (instead of the third) is performed in order to decrement the OBO backoff value by the number of detected-as-available random RUs.

As one can note, an OFDMA transmission according random procedure is not ensured for each TF reception: at least the OBO is decremented upon each reception of a Trigger Frame with "random RUs", which differs transmission to any one of subsequent trigger frames (depending of OBO value and number of random RUs offered by those further received TFs).

In the example of FIGS. 4a (and 4b), each 20 MHz channel (400-1, 400-2, 400-3 or 400-4) is sub-divided in frequency domain into four sub-channels or RUs 410, typically of size 5 MHz.

Of course the number of RUs splitting a 20 MHz channel may be different from four. For instance, between two to nine RUs may be provided (thus each having a size between 10 MHz and about 2 MHz).

As shown in the Figure, some Resource Units may not be used (410u) because no station with an OBO backoff value less than the number of available random RUs has randomly selected one of these RUs, whereas some other are collided (as example 410c) because at least two of these stations have randomly selected the same random RU. This shows that due to the random determination of random RUs to access, collision may occur over some RUs, while other RUs may remain free. The used RUs 410 may be fit by stations following the allocation scheme information (value AID) provided inside the TF (scheduled to a given AID non-zero value, or random when AID equals zero).

Once the stations have used the RUs to transmit data to the AP, the AP responds with a Multi-User acknowledgment (not show in the Figure) to acknowledge the data on each RU.

The FIG. 4b provides another exemplary scenario of 802.11ax, wherein the granted TXOP is shared for both downlink (451) and then uplink (450) OFDMA transmissions.

IEEE 802.11ax extends the usage of the RTS/CTS handshake mechanism to multi-user UL/DL scenarios. It is known as the "MU-RTS/CTS procedure".

According to the current version of the standard, the MU-RTS/CTS procedure allows an access point to reserve a TXOP for multi-user transmission through resource units, by sending a multi-user request control frame, noted MU-RTS frame, to request reservation of one or more 20 MHz communication channels. The MU-RTS frame (420) is considered as a variant of the above-mentioned trigger frame.

The MU-RTS trigger frame is duplicated on each requested 20 MHz channel and solicits, on each 20 MHz channel, the sending of a response frame or reservation acknowledging frame, CTS (421), by at least one station.

The standard specifies that the station sending the CTS frame 421 should have been allocated one of the resource units (DL in 451 or scheduled UL in 450). Different stations may reply with CTS frames on different 20 MHz channels.

The MU-RTS/CTS procedure shown in FIG. 4b may protect two modes of OFDMA transmission.

The first mode is the downlink (DL) direction (from the AP to the stations). The AP emits data inside OFDMA RUs 411 directly after the duplicated CTS frames 421 are received from the station(s) in response to the MU-RTS frame(s). The use of the MU-RTS frame makes it possible to solicit specific stations to send the CTS frames, thereby increasing protection of the following OFDMA RUs. In this mode, the RU allocations are defined within the PHY header of the RUs 411 (typically spread over a 20 MHz width, not represented in the figure). The stations thus do not require any RU allocation inside the MU-RTS frame 420, but only expect obtaining channel assignments to stations for the process of sending CTS frames.

The second mode is the uplink (UL) direction (from the stations to the AP). As mentioned above, the 802.11ax standard originally defined a trigger frame 430 to be sent by the AP on the reserved and granted (through conventional RTS/CTS handshake) channel. The conventional Trigger Frame 430 defines a plurality of resource units 410 forming the one or more communication channels 300-x for UL OFDMA transmission during the reserved transmission opportunity. The conventional Trigger Frame 430 is now protected through the MU-RTS frame 420 and CTS frames, and may be transmitted between 451 and 450 phase (not represented in the figure). Alternatively, the Trigger Frame 430 may be transmitted inside a DL RU (as 430 represented in the figure), in parallel to other DL transmission inside 451 phase. This optimization replaces the legacy transmission of the TF 430 according the control frame mode (FIG. 4a) which is time consuming. A condition is however that TF 430 inside a DL RU must not target any station having concurrent DL RU destined to it (as a station is only able to decode one DL RU at a time).

FIG. 4b has shown two additional usages for TF transmission, the first being that Trigger Frame can be used for TXOP protection/reservation (MU-RTS procedure), and the second being that Trigger Frame could be transmitted inside one downlink RU.

For the sake of illustration, the following will only focus on UL transmission direction, as this is the original target of generating trigger frame. One may note this is not limitative, as DL transmission can also be protected by TF MU-RTS according to the FIG. 4b.

Figure 5A:
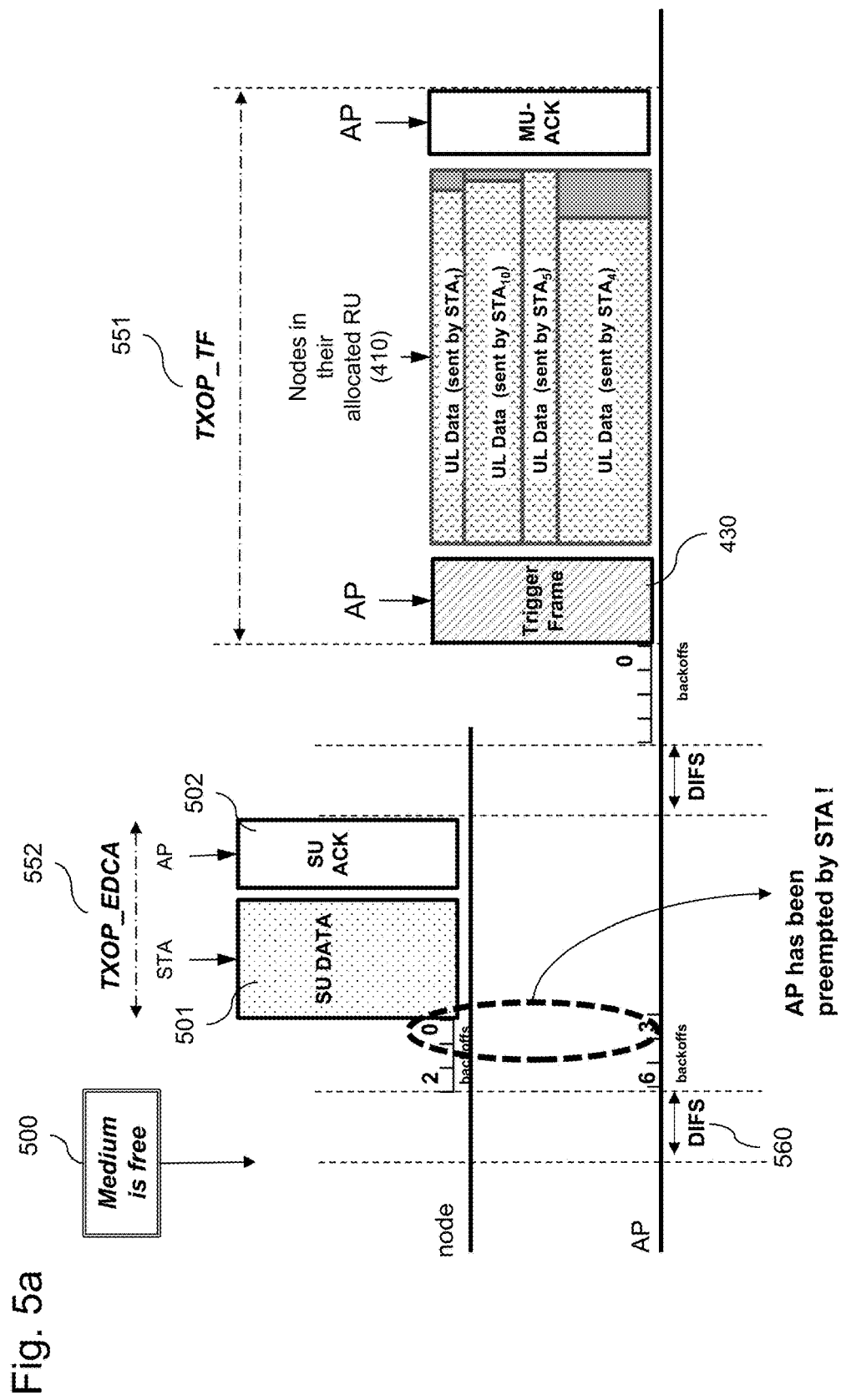
FIGS. 5a and 5b illustrate exemplary scenarios showing a conventional transmission of a Trigger Frame using EDCA mechanism.

FIG. 5a provides an exemplary scenario showing a conventional transmission of a Trigger Frame using EDCA mechanism, as depicted in FIG. 2a.

A station (including the AP with regards to data transmission) must sense the status of the wireless medium before transmitting. If it finds that the medium is continuously idle for DCF Interframe Space (DIFS) duration 560, it is then permitted to try to transmit a frame. If the channel is found busy during the DIFS interval 560, the station should defer its transmission.

Arbitration inter-frame spacing (AIFS), as earlier introduced, is a method of prioritizing one Access Category (AC) over the other, such as giving voice or video priority over background traffic. AIFS functions by shortening or expanding the period a wireless station has to wait before it is allowed to transmit its next frame. In the figure, even if DIFS is illustrated by 560, AIFS can be used instead.

The AIFS or DIFS period is followed by a backoff countdown procedure, performed by all stations having data to send (including the AP). Access to the medium is driven by a backoff counter that is decremented over time, to defer the transmission time for a random interval, thus reducing the probability of collisions on the shared channel. Upon the backoff time expiring, a station may send data or control frames if the medium is still idle.

This transmission mode (waiting DIFS/AIFS period and backoff countdown) provides a contention access onto the wireless channel.

In the example of the Figure, a non-AP station has first its contention period expired before the one of the AP. This non-AP station is thus allowed to send the data frames 501, within its granted EDCA TXOP 552. An ACK frame 502 is sent by the receiving station (specifically the AP for an infrastructure environment) after having correctly received the data frames sent, after a new SIFS time period. The SIFS (Short Interframe Space) is the amount of time in microseconds required for a wireless interface to process a received RF signal and its associated 802.11 frame and to generate a response frame.

Access to the radio medium for the other stations like the AP is consequently deferred by suspending their associated backoff timers and then by later resuming the timers when the NAV has expired (end of EDCA TXOP 552).

Later, the AP will be granted a TXOP for sending its Trigger Frame 430, once its corresponding backoff timer has expired (and also subject of no collision against any other non-AP station).

FIG. 5*a* demonstrates that the AP competes to access the wireless medium in the same way as the non-AP stations.

Figure 5B:
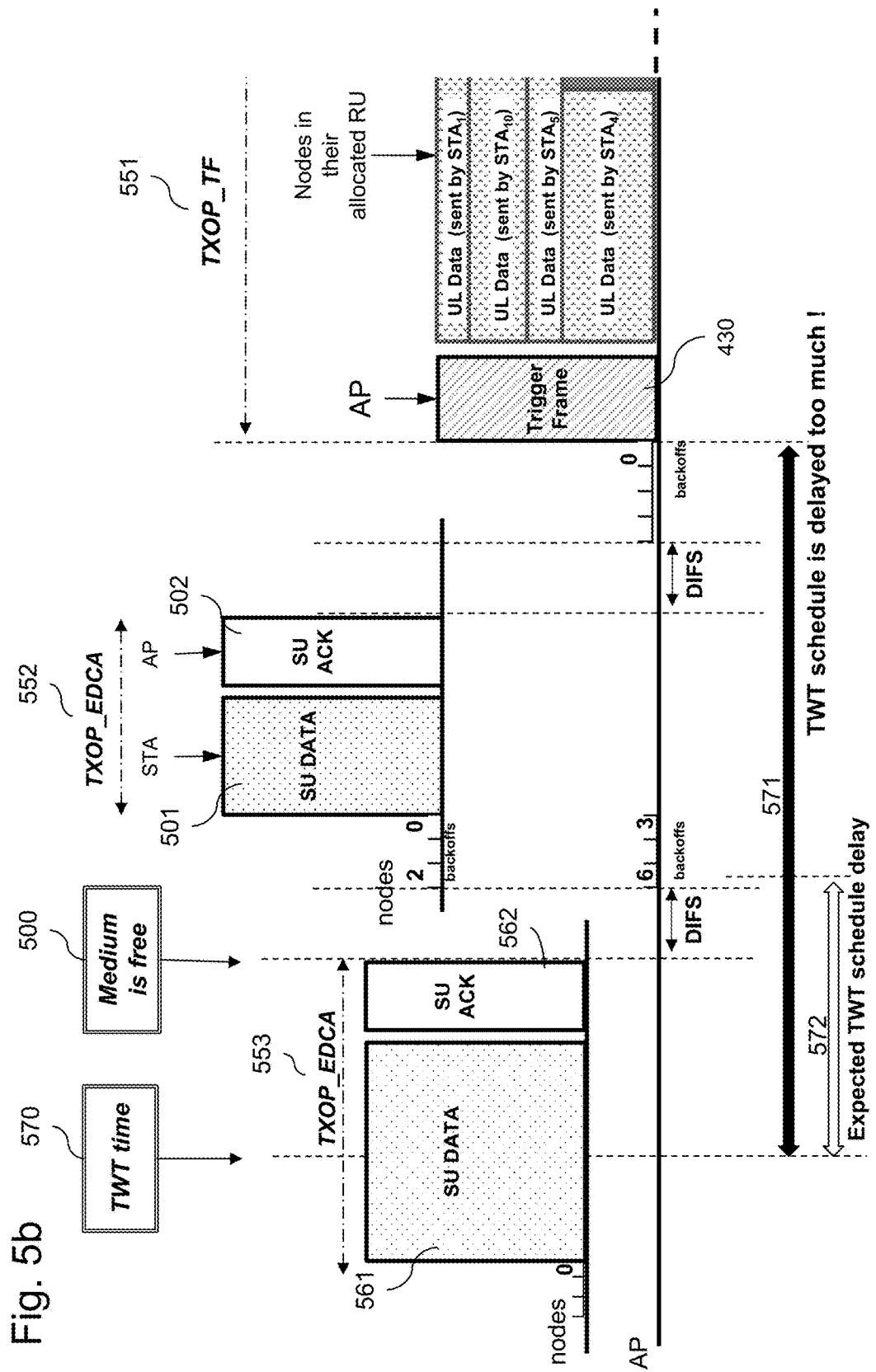

FIG. 5*b* shows the effect of a conventional transmission of a trigger frame in case of a target time is contracted by the AP to emit its trigger frame.

As example, a Target Wake-up Time (TWT Time 570) is raised at the AP in order to transmit a Trigger Frame. This date could be scheduled for internal purposes at the AP (e.g. according to internal scheduler for regularly polling of the non-AP stations of BSS), but can also be advertised to non-AP stations of the BSS (e.g. in order for them to be prepared to transmit uplink data).

In a preferred embodiment, the Target Wake Time (TWT) function according to 802.11ah is used as one possible power saving mechanism, to allow non-AP stations to sleep for periods of time, and wake up in pre-scheduled (target) times 570 to exchange uplink information with their AP.

At the beginning of each TWT interval or service period (starting at 570), the AP schedules the next Wake Interval (later than the current TWT time). Upon each TWT time expiration, AP is expected to sooner transmit its announced Trigger Frame 430, granted using legacy channel access, so that stations may transmit uplink frames in TXOP 551. Since the 802.11 standard cannot forbid legacy stations to transmit at beginning of the TWT service period, the expected TF frame(s) sent in a given TWT SP may face contention and collisions.

As a result, the service period is started at TWT time 570, but the transmission could not begin before the medium becomes free (500). Nevertheless, due to same effects as depicted in FIG. 5*a*, the TF 430 is delayed for transmission until the corresponding backoff at AP goes down to zero.

As a result, the effective delay 571 is larger than the expected delay 572.

In addition (not represented in the figure), as several non-AP stations have woken up at TWT time 570, and due to the missing TF, they may intend to take access onto the medium: this would clearly increase competition between stations when the medium becomes free in 500, and lets low chance for a correct transmission of the TF 430.

FIG. 5*b* clearly demonstrates the inefficiency of the conventional DCF/EDCA channel access for scheduled Trigger Frames (Trigger Frames which have an expected target transmission time).

This issue is really detrimental for dense scenarios addressed by 802.11ax, where 802.11ax stations may wake up at the same time, collide and avoid the transmission of Trigger Frame by the AP.

The present invention seeks to improve the transmission of Trigger Frames by a 802.11ax Access Point, in order to offer efficient resource units (RU) utilization for multi-user transmissions.

An exemplary wireless network is an IEEE 802.11ax network (and future versions). However, the invention applies to any wireless network comprising stations (for instance an access point AP 110 and a plurality of non-AP stations 101-107).

Figure 6:
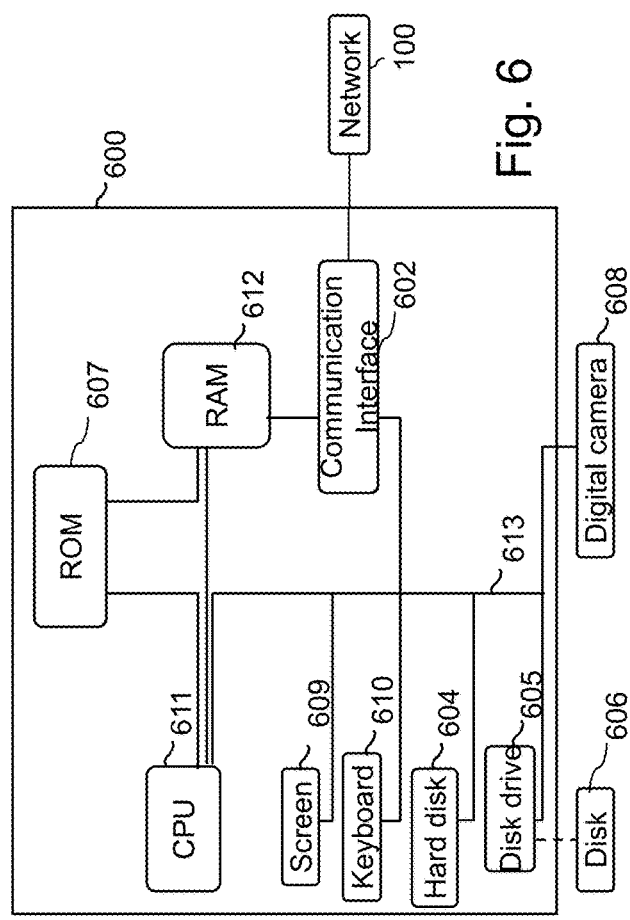
FIG. 6 shows a schematic representation a communication device or station in accordance with embodiments of the present invention.

FIG. 6 schematically illustrates a communication device 600 of the radio network 100, configured to implement at least one embodiment of the present invention. The communication device 600 may preferably be a device such as a micro-computer, a workstation or a light portable device. The communication device 600 comprises a communication bus 613 to which there are preferably connected:

- a central processing unit 611, such as a microprocessor, denoted CPU;
- a read only memory 607, denoted ROM, for storing computer programs for implementing the invention;
- a random access memory 612, denoted RAM, for storing the executable code of methods according to embodiments of the invention as well as the registers adapted to record variables and parameters necessary for implementing methods according to embodiments of the invention; and
- at least one communication interface 602 connected to the radio communication network 100 over which digital data packets or frames or control frames are transmitted, for example a wireless communication network according to the 802.11ax protocol. The frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components:

- a data storage means 604 such as a hard disk, for storing computer programs for implementing methods according to one or more embodiments of the invention;
- a disk drive 605 for a disk 606, the disk drive being adapted to read data from the disk 606 or to write data onto said disk;
- a screen 609 for displaying decoded data and/or serving as a graphical interface with the user, by means of a keyboard 610 or any other pointing means.

The communication device 600 may be optionally connected to various peripherals, such as for example a digital camera 608, each being connected to an input/output card (not shown) so as to supply data to the communication device 600.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to embodiments of the invention to be implemented.

The executable code may optionally be stored either in read only memory 607, on the hard disk 604 or on a removable digital medium such as for example a disk 606 as described previously. According to an optional variant, the executable code of the programs can be received by means of the communication network 603, via the interface 602, in order to be stored in one of the storage means of the communication device 600, such as the hard disk 604, before being executed.

The central processing unit 611 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Figure 7:
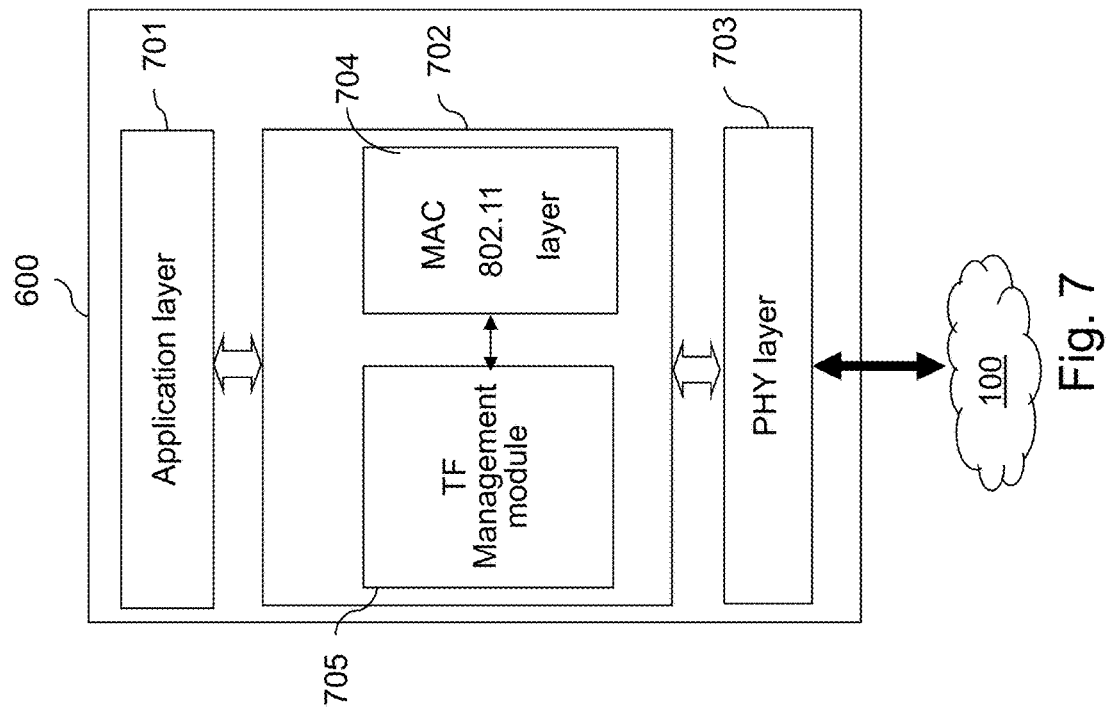
FIG. 7 shows a block diagram schematically illustrating the architecture of a wireless communication device in accordance with embodiments of the present invention.

FIG. 7 is a block diagram schematically illustrating the architecture of the communication device or node 600, which is the AP 110 of the network 100, adapted to carry out, at least partially, the invention. As illustrated, node 600 comprises a physical (PHY) layer block 703, a MAC layer block 702, and an application layer block 701.

The PHY layer block 703 (e.g. a 802.11 standardized PHY layer) has the task of formatting, modulating on or demodulating from any 20 MHz channel or the composite channel, and thus sending or receiving frames over the radio medium used 100, such as 802.11 frames, for instance single-user frames, such as control frames (RTS/CTS/ACK/Trigger Frame), MAC data and management frames, based on a 20 MHz width to interact with legacy 802.11 stations or with 802.11ax in legacy mode (such as for Trigger Frames), as well as MAC data frames of OFDMA type having preferably smaller width than 20 MHz legacy (typically 2 or 5 MHz) to/from that radio medium.

The MAC layer block or controller 702 preferably comprises a MAC 802.11 layer 704 implementing conventional 802.11ax MAC operations, and one additional block 705 for carrying out, at least partially, embodiments of the invention. The MAC layer block 702 may optionally be implemented in software, which software is loaded into RAM 612 and executed by CPU 611.

Preferably, the additional block 705 is a Trigger Frame management module which drives the AP in selecting the best transmission mode for transmitting trigger frames to 802.11ax (client, or non-AP) stations. For instance and not exhaustively, the AP station will consider the legacy data access mode (e.g. DCF or EDCA) which is contention-based, and also the priority medium access (restricted to Access Point devices) for medium access pre-emption.

On top of the Figure, application layer block 701 runs an application that generates and receives data packets, for example data packets of a video stream. Application layer block 701 represents all the stack layers above MAC layer according to ISO standardization.

Basically, according to first embodiments of the invention, there is provided two possible modes for transmitting a same type of control frame, typically the Trigger Frame: a contention based transmission mode and a preemption based transmission mode. Choosing between these two modes allows to better control the time at which access to the medium is gained.

Figure 8:
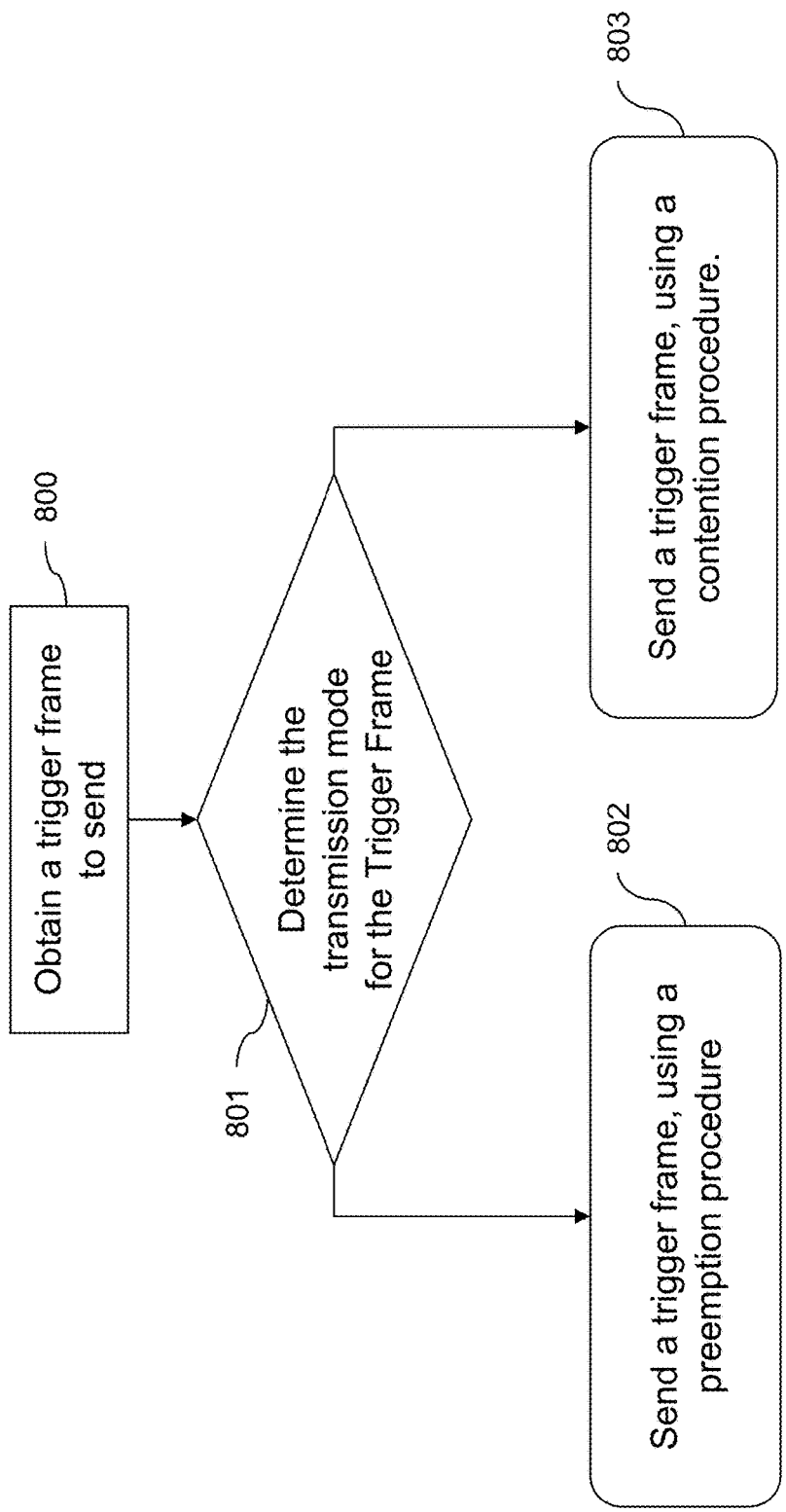
FIG. 8 depicts an exemplary flowchart according to first embodiments of the invention described in the context of 802.11ax.

FIG. 8 depicts an exemplary flowchart according to first embodiments of the invention described in the context of 802.11ax. In this exemplary flowchart, description is provided for a trigger frame, but the flowchart may apply more generally to control frames.

At step 800, the AP obtains a trigger frame to send. The obtaining may comprise retrieving from a memory an already constructed frame (such as a TWT related trigger frame which will be detailed later in relation with FIG. 10). Alternatively, the obtaining may comprise constructing the trigger frame at the time of transmission. For example, an MU-RTS TF may be generated for transmission without storage in an EDCA queue or stored in one of the EDCA queues for transmission.

At step 801 a test is performed to determine which of a preemption based transmission mode (step 802) or of a contention based transmission mode (step 803) is to be used for the transmission of the trigger frame.

A preemption based transmission mode (802) may be implemented by the AP sending a trigger frame after PIFS (PCF Interframe Space) duration once the wireless medium becomes free. PIFS duration is less than DIFS and greater than SIFS (DIFS>PIFS>SIFS). Hence AP always has more priority to access the medium (thus preempting transmission of other stations). Alternatively, the AP may send a trigger frame after AIFS duration or after a predetermined number of IFS (Interframe Space) durations.

A contention based transmission mode (803) may be implemented by the AP inserting the trigger frame in one of the AC queues, the trigger frame will be then transmitted according to EDCA procedure.

Figure 10:
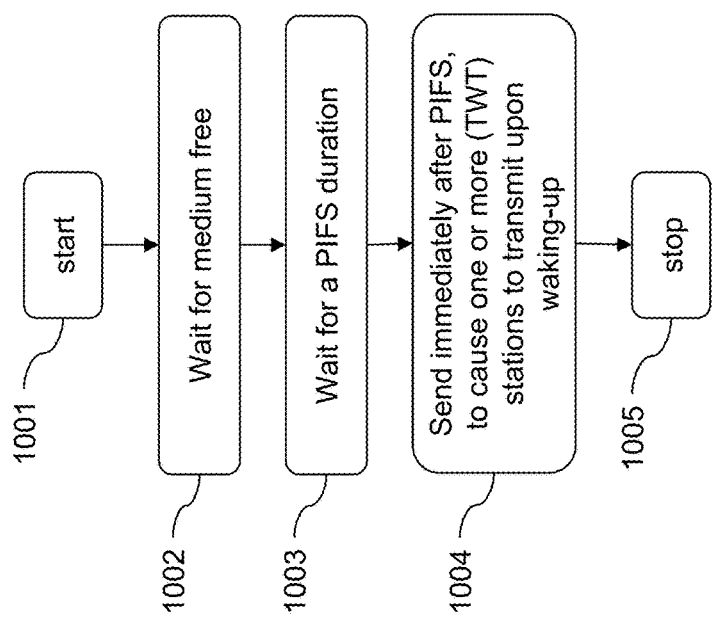
FIG. 10 illustrates, using a flowchart, an exemplary algorithm for transmission mode using pre-emption to access the wireless channel, at a 802.11ax Access Point of the network, according to embodiments of the invention.

According to one implementation of step 801, if transmission time of a TF needs to be tightly controlled, such as time-scheduled TFs, a preemption based transmission mode is chosen. FIG. 10 describes an example application that requires transmission time of TF to be controlled and for which the preemption based transmission mode is thus appropriate.

According to another implementation, determination of the transmission mode is based on a measure of congestion in the BSS; the more the network is congested, the better for the AP to preempt access to send a TF for scheduling access to the medium in a controlled and more efficient way. Indeed, scheduled transmissions are more bandwidth efficient compared to contention based transmissions in a highly loaded network, particularly when the stations have short frames to send. A measure of congestion may for example be the number of collisions in the BSS; if the number of collisions increases above a certain threshold, the AP sends a TF using a preemption transmission mode for scheduling uplink resource units for the stations to send their data. A measure of congestion may also be the amount of data waiting for transmission in the buffers of the AP; if the amount of data of one buffer or a plurality of buffers collectively increases above a certain threshold, the AP sends a TF using a preemption transmission mode for scheduling download resource units for the AP to send its data. A measure of congestion may also be the amount of data waiting for transmission in the buffers of the stations known to the AP by means of buffer status reports; if the amount of data of one buffer or a plurality of buffers collectively of one or more stations increases above a certain threshold, the AP sends a TF using a preemption transmission mode for scheduling upload resource units for the stations to send their data. A measure of congestion may also be any combination of the preceding criteria.

According to yet another implementation, determination of the transmission mode is based on the nature or type of the trigger frame. If the nature of the trigger frame is of low criticality, e.g. trigger frames concerning the soft management of the BSS such as reports or when the trigger frame concerns uplink data traffic from stations, a contention based transmission mode is chosen.

More generally, the AP as central coordinator and administrator of the BSS may take precedence for sending a control frame over stations' data traffic by using a preemption mode, instead of a by default contention mode, whenever it is necessary to ensure reliability, security and/or efficiency of the BSS. For example, if the AP perceives that the amount of pending data in its retransmission buffer(s) increases and there is a risk for DL transmissions to be stalled, the AP may send using preemption mode a MU-BAR trigger frame representing a Multi-User Block Ack Request for requesting stations to acknowledge, using UL RUs the AP has assigned to them, data the stations have correctly received.

In the above different implementations, the determination of the transmission mode in step 801 is performed when the trigger frame is obtained the first time by the AP at step 800. In a variant (not illustrated in FIG. 8), the determination of the most appropriate transmission mode can be assessed based on the criteria discussed above at different times before the trigger frame is actually transmitted. For example, it may firstly be determined that a contention based transmission mode is to be used for the transmission of the trigger frame, and because BSS conditions have evolved prior actual transmission of the trigger frame, it is then secondly determined that a preemption based transmission mode is to be eventually used for the transmission of the trigger frame.

In addition, if one transmission mode is associated by default with one type of the trigger frame as a determination criterion for step 801, another transmission mode may be associated temporarily with that trigger frame type if BSS conditions have changed, such as during severe load conditions of the BSS.

Basically, according to second embodiments of the invention, there is provided mechanisms for prioritizing the transmitting of a same type of control frame, typically the Trigger Frame relatively to the transmitting of data traffic.

Figure 9:
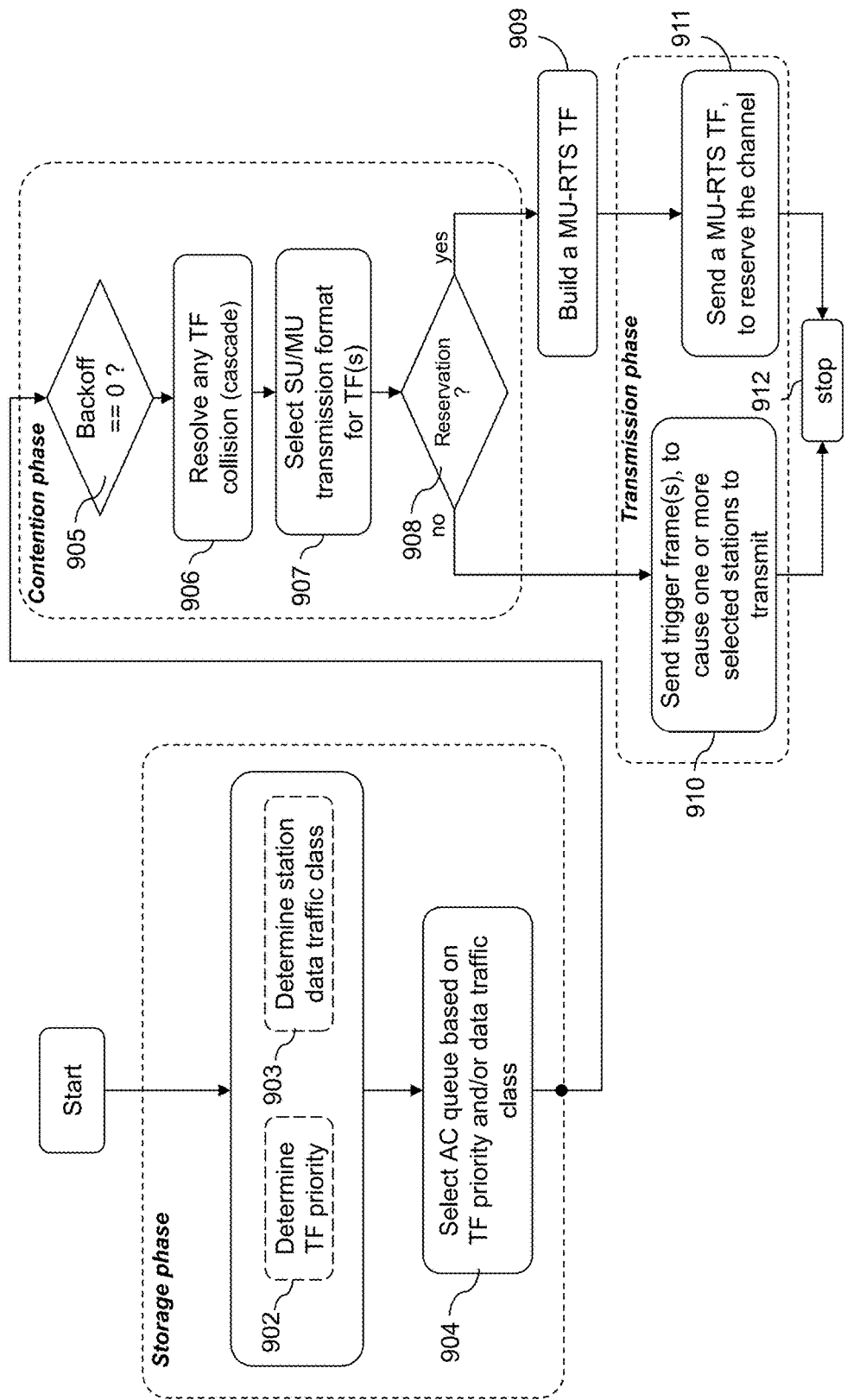
FIG. 9 depicts an exemplary flowchart according to second embodiments of the invention described in the context of 802.11ax.

FIG. 9 depicts an exemplary flowchart according to second embodiments of the invention described in the context of 802.11ax.

In this exemplary flowchart, description is provided for the transmission of a trigger frame using a contention access, but the flowchart may apply more generally to control frames and/or other transmission modes. For contention access, data traffic is served from EDCA queues (buffers) and the prioritization of the trigger frames is thus performed relatively to the IEEE 802.11 access categories. Aim is to keep a good balance between priorities of sending trigger frames and data traffic so that to maintain fairness in the use of the network bandwidth while fulfilling the priorities of control frames.

It is recalled that the Trigger Frame is a 802.11ax control frame which embeds information in its payload, aiming at providing additional information for the 802.11ax stations (the information informs about the purpose of the trigger frame, which stations can transmit during the specified MU TXOP time, etc.). Especially, the information encloses a "Trigger Type" subfield to indicate the type of the Trigger frame, and thus informing stations about which frame types they are allowed to transmit over the corresponding OFDMA RU. The Trigger Type subfield may be set to a value indicating a "basic" type (value 0, when the target is to poll stations for data only), or any explicit type in the case that the TF addresses a specific need (e.g. MU-RTS type, or MU-BAR type, etc.).

At an optional step 902, the priority of the trigger frame is determined. For example, a trigger frame which relates to data polling (i.e. Trigger Type subfield set to "basic" type) is determined to be of low priority and a trigger frame embedding a specific type of control request (other than "basic" type) is considered to be more urgent and is determined to be of high priority. Alternatively, several levels of priority (more than two) are determined for the trigger frame. Criteria discussed in relation with the first embodiments of the invention, e.g. measure of congestion, may be taken into account to discriminate between urgency of trigger frames and to determinate associated priority levels.

At a step 904, one AC queue at the AP is selected for conveying the trigger frame.

According to one implementation of step 904, a trigger frame that is determined to be of low priority is conveyed into one of the buffers AC0 to AC2 and a trigger frame that is determined to be of high priority is conveyed into the buffer AC3 (highest priority). If several priority levels are determined, a mapping can be performed between the determined priority level and the Access Categories AC0-AC3; the highest priority(ies) being assigned to AC3.

At an optional step 903, the class (TID according to IEEE 802.1D) of data traffic to be uploaded to the AP by a station is determined. This information may then be used by the AP, according to different implementations, to select the AC buffer for sending the trigger frame in response to which stations would send (upload) their data.

According to another implementation, the trigger frame is conveyed in the AC buffer that corresponds to the type of uplink traffic that the stations are requested to send in response to the trigger frame. In other words, if the class of data traffic to be uploaded to the AP is mapped at a station to a given Access Category, the trigger frame reserving RUs for uploading that traffic is conveyed in a buffer of the AP of the same given Access Category.

If the uplink traffic is associated with different classes (given ACs) at the station(s), the AP may select an Access Category for the trigger frame corresponding to the AC with the highest priority among the given Access Categories. Alternatively, the AP may select an Access Category for the trigger frame corresponding to the AC queue with the highest amount of data among the queues of the given Access Categories. Alternatively, the AP may select an Access Category for the trigger frame depending on the filling level of the queues of the given Access Categories. For example, three thresholds th1<th2<th3 may be set and the Access Category for the trigger frame may be selected as follows: AC0 if filling level of all queues is below th1, AC1 if filling level of at least one queue is not lower than th1 but the filling level of all queues is lower than th2, AC2 if filling level of at least one queue is not lower than th2 but the filling level of all queues is lower than th3 and AC3 if filling level of at least one queue is not lower than th3. Consequently and for example, Access Category of highest priority (AC3) is selected for the trigger frame if at least one queue of the given Access Categories exceeds the third threshold th3. This means that if one of the queues at a station is near to be saturated with data to be sent to the AP, high priority is given to the trigger frame for reserving resource units for that station.

According to yet another implementation, the priority level of the trigger frame (determined at step 902) and the class of the data traffic to be uploaded from the stations (determined at step 903) are combined to determine the Access Category for conveying the trigger frame (step 904). For example, if the trigger frame is determined to be of high priority, it is conveyed into the buffer AC3 and if the trigger frame is determined to be of low priority, one of the buffers AC0 to AC2 is chosen based on the class of the data traffic to be uploaded from the stations. The class of the data traffic is thus used when a plurality of ACs are available for a given trigger frame priority.

According to yet another implementation of step 904, if the TF schedules for the stations random RUs, i.e. it is a Trigger Frame for random-access, then AC3 may be used by default as the AP is not aware which station would make access to the random RUs to upload data (no TID specified in the TF).

As discussed above in relation with FIG. 2a, EDCA mechanism ensures that on average high priority traffic has a higher chance of being sent than low priority traffic. Thus choosing a certain Access Category for conveying a frame guarantees that that frame will be sent with the priority associated with the Access Category only on average. In the following are provided implementation variants for step 904 that ensure instant priority rather than average priority. These variants are advantageous when the AP needs to react quickly or to guarantee that a control frame is sent in a specific time schedule.

According to yet another implementation, the AC backoffs 211 are taken into account for the selection of the AC queue for conveying the trigger frame (step 904). Indeed, the AC queue with the highest priority can be seen as the one that has the lowest backoff value, i.e. the next AC queue from which data will be sent on the medium. Consequently, a trigger frame that is determined to be of high priority is conveyed into the AC queue which backoff value is the lowest.

Other variants may be considered in combination with the above different implementations to finely control the time at which a control frame, such as a trigger frame, is sent over the medium.

According to one variant, when an AC queue is selected (step 904), the trigger frame is inserted in the front of the queue, i.e. next data to leave the queue, (or prior any previously stored trigger frame) when the trigger frame is of high priority, and the trigger frame is inserted in the back of the queue if it is of low priority.

According to another variant, if several priority levels are determined for the trigger frame, several insert positions between the back and the front of the queue can be considered.

According to yet another variant, if several priority levels are determined, a mapping can be performed between the determined priority level and the pair (Access Category; insertion position in the queue of the Access Category); the highest priority being assigned to the front of the AC3 queue.

It can also be envisaged to switch between one variant and another depending on the load or network conditions of the BSS.

Next, once the trigger frame is stored in one AC queue, a conventional backoff countdown procedure is executed. This corresponds to the contention phase, where the AP waits one of its EDCA backoff engines going down to zero (test 905).

Since the ACs operate concurrently in accessing the wireless medium, it may happen that two ACs at the AP have their backoff counters ending simultaneously. In such a situation and according to one implementation, the virtual collision handler 212 of the MAC controller operates a selection of the AC having the highest priority between the conflicting ACs, and gives up transmission of data frames from the ACs having lower priorities. Then, the virtual collision handler commands those ACs having lower priorities to start again a back-off operation using an increased CW value.

In a preferred implementation, the functioning of collision handler 212 is modified with regards to the handling of trigger frames (step 906). The contents of the at least two ACs having their backoff expired simultaneously are inspected. If a trigger frame is present in the AC having the highest priority between the conflicting ACs, the AC having the highest priority is selected by the virtual collision handler so that the trigger frame will have better chances to be transmitted (if the trigger frame is in the front of the selected AC queue, it will be sent at the next transmission). If a trigger frame is present in the AC not having the highest priority between the conflicting ACs, the AC (of lower priority) containing the trigger frame is selected by the virtual collision handler so that the trigger frame will be eventually transmitted in priority. In a variant, the AC (of lower priority) containing the trigger frame is selected only if the trigger frame is in the front of the AC queue, i.e. next data to leave the queue, so that to ensure that the selection of the lower priority AC would necessarily lead to the transmission of the trigger frame. If a plurality of trigger frames are present in the queues of a plurality of conflicting ACs, the AC that experienced the highest number of collisions in the past, i.e. contention window CW is the highest, is selected by the virtual collision handler so that to increase chances of a successful transmission for long-time waiting trigger frames.

According to one implementation, the AP may aggregate several Trigger Frames of a same type. For example, TFs representing Buffer Status Requests for various TIDs may be aggregated into a single TF targeting a multiple-TID report from different stations (instead of sending multiple non-aggregated TF requests to the stations). This allows to reduce the number of transmitted trigger frames and save bandwidth.

According to another implementation, the transmission of two or more trigger frames is performed in cascading mode. IEEE 802.11ax provides means for an AP to send successively a plurality of trigger frames by means of a Cascade Indication inside each Trigger Frame. For instance, a Cascade Indication subfield is set to 1 when a subsequent Trigger frame will follow the current Trigger frame. Otherwise, the Cascade Indication subfield is set to 0 (for the last trigger frame of the series).

Next, at step 907, the transmission format of a trigger frame to send is determined. The trigger frame may transmitted in a multi-user (MU) format, e.g. TF 430 of FIG. 4b which is sent inside one DL RU, or may be transmitted in single-user (SU) format, e.g. TF 430 of FIG. 4a which is sent in legacy (i.e. prior 802.11 n) non-HT duplicate format.

Some considerations need to be taken into account when determining the trigger frame format. If the trigger frame is for a station that is at the same time the recipient of DL data in the selected AC buffer, the multi-user (MU) format should not be selected and the trigger frame should be transmitted in legacy (i.e. prior 802.11 n) non-HT duplicate format after the DL phase (which will trigger OFDMA UL 450). In other words, a trigger frame inside a DL OFDMA RU shall not include the resource allocation information of client stations which are recipients of frames in other RUs of the DL OFDMA. Also, having a plurality of TFs in DL OFDMA may be subject to the number of RUs that the AP intends to allocate in the uplink direction (for receiving uplink traffic from client stations). The number of RUs envisaged by the at least two parallel TFs should be less than the maximum number of RUs available on the composite channel.

At step 908, the AP decides if a reservation mechanism is needed for the on-going communication. If yes, at step 909, a Trigger Frame for MU-RTS is prepared and emitted at step 911 for protecting MU transmissions during the TXOP. Client stations that would respond with CTS frames are carried inside the MU-RTS trigger frame, and may be (but not limited to) a subset of the ones having assigned DL RUs. In that case, trigger frame(s) prepared in step 907 and DL traffic are kept in memory in order to be emitted upon reception of CTS frames. The trigger frames of MU-RTS type are created real-time, and not stored in any AC queue.

Note that step 906 could be executed again (not represented in the figure), in case not all CTS frames are received in response to the MU-RTS, which is indicative of a lower width reservation compared to the targeted composite channel of MU-RTS.

If no reservation is decided at step 908, trigger frame(s) prepared in step 907 are transmitted over the medium in step 911.

FIG. 10 illustrates, using a flowchart, an exemplary algorithm for transmission mode using pre-emption to access the wireless channel, at a 802.11ax Access Point of the network, according to embodiments of the invention. This flowchart represents one possible implementation of step 802 of FIG. 8.

For example, the AP may schedule channel access times for some stations: an exemplary mechanism is Target Wake Time (TWT), which allows the AP to schedule a series of times for a station when the station wakes up is order to send (or receive) frames. Due to this mechanism, client stations can stay in the doze state until the next TWT event. IEEE 802.11ah defines a target wake time (TWT), which is exchanged during station association with the AP. The TWT determines how, when, and how often a station wakes up.

The AP starts the procedure (step 1001) at the beginning of each service period (570). According to the TWT protocol, this period may be called a trigger-enabled TWT Service Period, as the Target Wake-up Time period is triggered by a Trigger Frame.

According embodiments of the invention, at least one Trigger Frame must be sent immediately at the beginning of TWT period.

Embodiments of the invention advantageously allows to emit directly a Trigger Frame after a PIFS period (step 1003) once the wireless medium becomes free after a TF emission period has elapsed anew (as example the TWT service period). The TF has no need to be stored in one of the AP's EDCA queue, as it is not served through EDCA protocol. In a preferred embodiment, the TF may be prepared before starting a new service period and stored in RAM 612. As a result, the priority access of 802.11 is applied to Trigger Frames having a target time (e.g. according TWT or any alternative schedule or power saving mechanism).

FIG. 11 illustrates, using a timeline, a scenario of transmission of a scheduled TF according to embodiments of the invention.

The illustrated scenario is similar to that of FIG. 5b, and shows the advantages of embodiments of the invention with regards to the use pre-emption mode offered to a scheduled trigger frame.

As embodiments of the invention routes the trigger frames with targeted time contract to a pre-emption procedure (802), then such trigger frames are sent directly at the targeted time, that is to say the targeted time makes the AP lasts only a PIFS duration, or alternate durations, (1100) once the medium is free.

The waiting delay (1171) for sending the trigger frame once the target time has expired is greatly reduced compared to critical situation of FIG. 5b (delay 571).

Delay 1171 is also lower than expected delay 572 of the client stations (because PIFS<DIFS duration).

This is to avoid any delay for the AP to take the medium, otherwise some woken-up stations may have try to emit onto the medium at the same time and may collide (in between stations and also with the AP). This also advantageously saves bandwidth of the wireless channel.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A wireless communication method in a wireless network comprising an access point and a plurality of stations, the method comprising the following steps, at the access point:

selecting a transmission mode among a first and a second transmission modes, wherein access to a communication channel in the first transmission mode uses a contention mechanism with stations of the network, while access to the communication channel in the second transmission mode uses a preemption mechanism;

sending a trigger frame to the stations using the selected transmission mode, the trigger frame reserving a transmission opportunity on at least one communication channel of the wireless network and defining resource units forming the communication channel and including a plurality of resource units that the stations can access for sending data, wherein the sending of a trigger frame is performed:

after a point coordination function interframe space period of waiting in a case where the trigger frame is a scheduled trigger frame, and after a distributed coordination function interframe spacing period of waiting in a case where the trigger frame is a non-scheduled trigger frame; and receiving data from stations over the defined resource units.

2. The method of claim 1, wherein the selecting is based on at least one of the following: nature of trigger frame, priority of the trigger frame, class of data traffic to be transmitted in the resource units defined by the trigger frame, and measure of congestion in the network.

3. A wireless communication method in a wireless network comprising a physical access point and a plurality of stations, the method comprising the following steps, at the access point:

selecting a transmission queue associated with an access category, the access category defining a priority for accessing the wireless network;

sending a trigger frame to the stations using the selected transmission queue, the trigger frame reserving a transmission opportunity on at least one communication channel of the wireless network and defining resource units forming the communication channel and including a plurality of resource units that the stations can access for sending data, wherein the sending of a trigger frame is performed:

during a point coordination function interframe space period in a case where the trigger frame is a scheduled trigger frame, and during a distributed coordination function interframe spacing period in a case where the trigger frame is a non-scheduled trigger frame; and receiving data from stations over the defined resource units.

4. A communication device in a wireless network comprising a physical access point and a plurality of stations, the communication device comprising at least one microprocessor configured to:

select a transmission mode among a first and a second transmission modes, wherein access to a communication channel in the first transmission mode uses a contention mechanism with stations of the network, while access to the communication channel in the second transmission mode uses a preemption mechanism;

send a trigger frame to the stations using the selected transmission mode, the trigger frame reserving a transmission opportunity on at least one communication channel of the wireless network and defining resource units forming the communication channel and including a plurality of resource units that the stations can access for sending data, wherein the sending of a trigger frame is performed:

during a point coordination function interframe space period in a case where the trigger frame is a scheduled trigger frame, and during a distributed coordination function interframe spacing period in a case where the trigger frame is a non-scheduled trigger frame; and receive data from stations over the defined resource units.

5. A communication device in a wireless network comprising a physical access point and a plurality of stations, the communication device comprising at least one microprocessor configured to:

select a transmission queue associated with an access category, the access category defining a priority for accessing the wireless network;

send a trigger frame to the stations using the selected transmission queue, the trigger frame reserving a transmission opportunity on at least one communication channel of the wireless network and defining resource units forming the communication channel and including a plurality of resource units that the stations can access for sending data, wherein the sending of a trigger frame is performed:

after a point coordination function interframe space period of waiting in a case where the trigger frame is a scheduled trigger frame, and after a distributed coordination function interframe spacing period of waiting in a case where the trigger frame is a non-scheduled trigger frame; and receive data from stations over the defined resource units.

* * * * *